United States Patent [19]

Bussink et al.

[11] Patent Number: 4,668,723
[45] Date of Patent: May 26, 1987

[54] POLYPHENYLENE ETHER COMPOSITIONS CONTAINING POLYFUNCTIONAL COMPOUNDS

[75] Inventors: Jan Bussink; Roelof van der Meer, both of Bergen op Zoom, Netherlands

[73] Assignee: General Electric Company, Selkirk, N.Y.

[21] Appl. No.: 786,769

[22] Filed: Oct. 11, 1985

[30] Foreign Application Priority Data

Oct. 11, 1984 [NL] Netherlands ................. 8403091

[51] Int. Cl.⁴ ................................. C08K 5/34
[52] U.S. Cl. ........................... 524/105; 524/306; 524/508; 525/66; 525/68; 525/92; 525/905
[58] Field of Search ............ 525/68, 905, 534, 66; 524/105, 306, 508

[56] References Cited

U.S. PATENT DOCUMENTS 3,383,435  5/1968  Cizek ............................. 525/905
4,389,516  6/1983  Sugio et al. ..................... 525/534

*Primary Examiner*—Jacob Ziegler
*Attorney, Agent, or Firm*—Michael J. Doyle

[57] ABSTRACT

The sensitivity to stresses and the melt strength of thermoplastic polymer mixtures which comprise a polyphenylene ether and a polyvinyl aromatic compound can be improved by the addition of a polyfunctional dienophilic compound, for example, a bismaleimide or of a polyfunctional conjugated diene compound, for example, divinyl benzene.

8 Claims, No Drawings

POLYPHENYLENE ETHER COMPOSITIONS CONTAINING POLYFUNCTIONAL COMPOUNDS

The invention relates to a thermoplastically deformable polymer mixture comprising the following constituents or one or more reaction products thereof:
(A) a polyphenylene ether;
(B) a polyvinyl aromatic compound, and
(C) a polyfunctional compound selected from one or more compounds of the group consisting of polyfunctional dienophilic compounds and polyfunctional conjugated diene compounds.

The invention provides thermoplastically deformable polymer mixtures having improved properties as compared with the known polymer compounds which comprise a polyphenylene ether and a polyvinyl aromatic compound. In comparison with the said known polymer mixtures the polymer mixtures according to the invention have a reduced sensitivity to stresses in the presence of solvents (environmental stress crack resistance) and a greater melting strength, which is of importance for certain thermoplastic designing techniques, for example, blow moulding.

This improvement with respect to the above-mentioned properties is ascribed to the addition of a polyfunctional compound C. The polyfunctional compound C is selected from the group consisting of polyfunctional dienophilic compounds and polyfunctional conjugated diene compounds. A suitable group of polyfunctional dienophilic compounds comprises bismaleimides.

United States Patent Specification 4,389,516 discloses a curable polyphenylene ether mass which consists of a polyphenylene ether and at least one polyfunctional compound. The polyfunctional compound may be a polyfunctional maleimide, for example, the bismaleimide derived from maleic anhydride and bis-(4-aminophenyl)-methane. The known resin masses are thermohardeners which in particular can very well withstand high temperatures.

The polymer mixtures according to the invention are not thermohardeners, but thermoplasts. The polymer mixtures according to the invention always comprise a polyvinyl aromatic compound.

The polymer mixtures according to the invention preferably comprise 0.01–4% by weight of C with respect to the sum of the parts by weight of A and B. A preferred composition comprises 5–95% by weight of A; 5–95% by weight of B, to which 0.01–4% by weight of C has been added. When C is an dienophilic compound, preferably more than 0.01% by weight, but less than 1% by weight thereof is used. When C is a polyfunctional conjugated diene compound, a quantity of 0.01–4% by weight is preferably used.

The polymer mixtures according to the invention comprise at least the above-mentioned constituents A, B, and C. It is assumed that one or more different reactions occur between two or more of the constituents A, B, and C which lead to a polymer mixture having the desired properties. Which reactions exactly occur is not known.

A.
POLYPHENYLENE ETHERS

Polyphenylene ethers are compounds known per se. For this purpose reference may be made to the U.S. Pat. Nos. 3,306,874; 3,306,875; 3,257,357 and 3,257,358.

Polyphenylene ethers are usually prepared by an oxidative coupling reaction—in the presence of a copper amine complex—of one or more bivalent or trivalent substituted phenols in which homopolymers and copolymers, respectively, are obtained. Copper amine complexes derived from primary, secondary and/or tertiary amines may be used. Examples of suitable polyphenylene ethers are:
poly(2,3-dimethyl-6-ethylphenylene-1,4-ether)
poly(2,3,6-trimethylphenylene-1,4-ether)
poly(2-bromo-6-phenylphenylene-1,4-ether)
poly(2-methyl-6-phenylphenylene-1,4-ether)
poly(2-phenylphenylene-1,4-ether)
poly(2-chlorophenylene-1,4-ether)
poly(2-methylphenylene-1,4-ether)
poly(2-chloro-6-ethylphenylene-1,4-ether)
poly(2-chloro-6-bromophenylene-1,4-ether)
poly(2,6-di-n-propylphenylene-1,4-ether)
poly(2-methyl-6-isopropylphenylene-1,4-ether)
poly(2-chloro-6-methylphenylene-1,4-ether)
poly(2-methyl-6-ethylphenylene-1,4-ether)
poly(2,6-dibromophenylene-1,4-ether)
poly(2,6-dichlorophenylene-1,4-ether)
poly(2,6-diethylphenylene-1,4-ether)
poly(2,6-dimethylphenylene-1,4-ether)

Copolymers, for example, copolymers derived from two or more phenols as used in the preparation of the above-mentioned homopolymers, are also suitable. Furthermore, graft copolymers and block copolymers of vinyl aromatic compounds, for example polystyrene and of polyphenylene ether as described above, are suitable.

B.
POLYVINYL AROMATIC COMPOUNDS

As a polyvinyl aromatic compound may be used a compound which is built up from more than 25 mol. % of units of a compound of the formula $R-C(C_6H_{(5-p)}Z_p)=CH_2$, in which R is a hydrogen atom, a lower alkyl group (having, for example, 1–6 carbon atoms) or a halogen atom, Z is a hydrogen atom or a halogen atom or a lower alkyl group or a vinyl group and p=0 or an integer from 1–5. The rubber-modified high-impact polyvinyl aromatic compounds are also suitable. Examples of polyvinyl aromatic compounds are homopolymers such as polystyrene itself, polychlorostyrene or polybromostyrene and polyalphamethyl styrene, rubber-modified polystyrenes such as the commercially available high-impact polystyrene polymers and also the styrene-containing copolymers, for example, styrene-acrylonitrile copolymers, styrene-butadiene copolymers, styrene-acrylonitrile-butadiene terpolymers, copolymers of ethyl vinylbenzene and divinyl benzene, and the like.

C.
POLYFUNCTIONAL COMPOUND

The polymer mixtures according to the invention comprise a polyfunctional compound selected from one or more compounds from the group consisting of polyfunctional dienophilic compounds and polyfunctional conjugated diene compounds. Polyfunctional compounds are to be understood to mean herein compounds which comprise more than one dienophilic group or comprise a dienophilic group and a set of conjugated double bonds. Polyfunctional conjugated diene compounds are to be understood to mean herein compounds which comprise more than one set of conjugated double bonds or a set of conjugated double bonds and a dienophilic group. Diene compounds and dienophilic compounds are to be understood to mean the compounds known as such for Diels-Alder reactions (see, for example, Fieser and Fieser, Advanced Organic Chemistry, New York, 1963, pp. 206–211). It is also possible to use precursors of such polyfunctional dienophilic and conjugated diene compounds.

Examples of suitable polyfunctional dienophilic compounds are bismaleimides, bismaleaminic acids, polyacrylates, for example, ethylidene dimethacrylate, pentaerythritol tetramethacrylate, trimethylolpropane-trimethacrylate, ethylene glycol dimethacrylate.

Suitable examples of a bismaleimide are the reaction product of maleic anhydride and bis-(4-aaminobenzene) methane and ethylene bismaleimide.

Examples of suitable polyfunctional conjugated diene compounds are the divinyl aromatic compounds of the formula $CH_2=C(R)-C_6H_{(4-p)}Z_p-C(R')=CH_2$, wherein R and R' independently of each other are a hydrogen atom, a lower alkyl group (having, for example, 1–6 carbon atoms) or a halogen atom, Z is a hydrogen atom or a halogen atom or a lower alkyl group or a vinyl group. Divinylbenzene may be mentioned by way of example.

In addition to the above-mentioned constituents the polymer mixtures according to the invention may comprise further constituents such as the usual agents to improve the impact strength, polyolefins, fillers, reinforcing fibres, for example, glass fibres and carbon fibres, antistatics, stabilizers, softeners, flame retarding agents, dyes and the like.

Particularly suitable agents to improve the impact strength are the styrene-butadiene block copolymers generally used in similar polymer mixtures. These block copolymers may be so-called diblock copolymers or triblock copolymers; they may be hydrogenated entirely or partly.

The polymer mixtures according to the invention may be prepared by mixing in the melt the above-mentioned constituents A, B, and C. Mixing in the melt is usually carried out in an extruder at temperatures from 250° to 310° C. The extrudate is usually chopped to pieces. The resulting pieces may be formed into articles by injection moulding or extrusion, for example, blow moulding. It is possible to prepare the polymer mixtures according to the invention by first extruding together two of the constituents A, B, and C, after which the third constituent is extruded with the obtained pre-extrudate.

The invention will be described in detail with reference to the following specific examples.

EXAMPLES I, II, III, COMPARATIVE EXAMPLE A

Four thermoplastic mixtures were prepared having a composition as indicated in Table A hereinafter. As a polyphenylene ether was always used the same poly(2,6-dimethyl-1,4-phenylene ether) having an intrinsic viscosity of 49 ml/g measured in chloroform at 25° C. As a polyvinyl aromatic compound, was always used the same high-impact polystyrene (HIPS) based on a polybutadiene rubber.

In the Examples I, II, and III according to the invention, (1,1'-methylene-4,1-phenylene) bismaleimide was always used as a polyfunctional compound. In the comparative example A no polyfunctional compound was used.

The said constituents were extruded in a Werner Pfleiderer double-blade extruder at a temperature of 280° C., a speed of 300 rpm, a flow rate of 5 kg per hour. The extrudate was chopped to pieces. Normalized bars were manufactured from the resulting product by means of injection moulding. The following properties of the resulting bars were determined: notch impact value according to Izod (ASTM D 256); the environmental stress crack resistance; the tensile strength (DIN 53455), the residue after extraction with toluene, the quotient (R) of the viscosity at two different shear rates and the elasticity modulus (G') at a shear rate of 1 per second at 280° C.

Polymer mixtures suitable for blow moulding preferably have an as high as possible value for quotient R and an as high as possible modulus of elasticity (G')—measured at the processing temperature—at a low shear rate.

The environmental stress crack resistance (ESCR) was determined of ASTM type 1 bars as they are used to determine the tensile strength according to ASTM D 638. Always four or more bars were clamped in a metal curved jig so that the bars were elongated on their outside (outer fibre) by 0.85%. At instant zero the bars (clamped in the jig) were dipped in tri-n-butyl phosphate. The time (in seconds) until the first crack was observed and the time to fracture were determined. In the Table, the average of four or more measurements is always recorded.

The results obtained are also recorded in Table A.

It may be seen from the results of Table A that the addition of a small quantity of bismaleimide leads to a considerable improvement of the environmental stress crack resistance. In comparative Example A, a residue (substantially consisting of polybutadiene gel originating from the HIPS) of 8.2% remains after extraction with toluene; in Example III according to the invention the residue content is 8.6%. This proves that no curing of the polyphenylene ether has occured. This also appears from the good thermoplastic processibility of the polymer mixtures according to the invention.

TABLE A

|  | Comparative example A | Example I | Example II | Example III |
|---|---|---|---|---|
| Composition (parts by weight) | | | | |
| Polyphenylene ether | 50 | 50 | 50 | 50 |
| HIPS | 50 | 50 | 50 | 50 |
| Bismaleimide | — | 0.1 | 0.2 | 0.3 |
| Properties | | | | |
| Notch impact value according to Izod (J/m) | 179 | 176 | 181 | 184 |
| ESCR first crack formation (s) | 82 | 141 | 154 | 193 |
| ESCR fracture (s) | 139 | 236 | 254 | 308 |
| Tensile strength (N/mm$^2$) upon fracture | 53.1 | 53.6 | 52.5 | 53.6 |
| Toluene extract (wt. % residu) | 8.2 | — | — | 8.6 |
| R-value* | 5.2. | — | 6.1 | — |
| Modulus of elasticity | 1,970 | — | 3,300 | — |

TABLE A-continued

|  | Comparative example A | Example I | Example II | Example III |
|---|---|---|---|---|
| **(N/m$^2$) |  |  |  |  |

*R-value determined as melt viscosity at 280° C. and a shear rate of 1 per second divided by melt viscosity at 280° C. and shear rate of 100 second. Measurements were carried out with a Rheometrics RDS 7700 viscometer with parallel plates.
**determined at 280° C. and a shear rate of 1 per second.

EXAMPLES IV, V, AND VI

The experiments according to examples I, II, and III were repeated, 0.1 part by weight, 0.2 parts by weight, and 0.3 parts by weight of divinyl benzene, respectively, being used instead of a bismaleimide.

The composition of the resulting polymer mixtures and the resulting properties are recorded in Table B. The results of comparative example A are again recorded in Table B for completeness' sake.

TABLE B

|  | Comparative example A | Example IV | Example V | Example VI |
|---|---|---|---|---|
| Composition (parts by weight) |  |  |  |  |
| Polyphenylene ether | 50 | 50 | 50 | 50 |
| HIPS | 50 | 50 | 50 | 50 |
| Divinylbenzene | — | 0.1 | 0.2 | 0.3 |
| Properties |  |  |  |  |
| Notch impact value according to Izod (J/m) | 179 | 187 | 194 | 193 |
| ESCR first crack formation (s) | 82 | 106 | 151 | 206 |
| ESCR fracture (s) | 139 | 178 | 247 | 310 |
| Tensile strength (N/mm$^2$) | 53.1 | 51.6 | 53.6 | 54.8 |
| R-value* | 5.2 | — | — | 6.6 |
| Modulus of elasticity* (N/m$^2$) | 1,970 | — | — | 3,910 |

*See Table A.

The results of Table B clearly show the favourable influence of divinylbenzene on the R-value, modulus of elasticity, and ESCR.

EXAMPLES VII, VIII, IX, AND X; COMPARATIVE EXAMPLE B

While using the same constituents and according to the same method as described with reference to Examples I to VI, mixtures were prepared with 57 parts by weight of polyphenylene ether and 25 parts by weight of HIPS to which the bismaleimide mentioned in Example I and the divinylbenzene mentioned in Example IV, and no polyfunctional compound, respectively, were added. In the extrusion a temperature of 300° C. instead of 280° C. was used. For the exact composition, see Table C hereinafter.

The properties of the resulting polymer mixtures were determined. All the polymers could be readily deformed thermoplastically. The resulting properties are also recorded in Table C.

The results of Table C show clearly, also at higher polyphenylene ether contents, the favourable effect of the polyfunctional compound.

TABLE C

|  | Comparative Example B | Example VII | Example VIII | Example IX | Example X |
|---|---|---|---|---|---|
| Composition (parts by weight) |  |  |  |  |  |
| Polyphenylene ether | 75 | 75 | 75 | 75 | 75 |
| HIPS | 25 | 25 | 25 | 25 | 25 |
| Bismaleimide | — | — | 0.2 | — | 1 |
| Divinylbenzene | — | 0.2 | — | 1 | — |
| Properties |  |  |  |  |  |
| Notch impact value according to Izod (J/m) | 144 | 138 | 135 | 144 | 129 |
| ESCR first crack formation (s) | 93 | 268 | 102 | 308 | 179 |
| ESCR fracture (s) | 138 | 367 | 166 | 421 | 234 |
| Tensile strength (N/mm$^2$) | 57.3 | 57.8 | 59.8 | 58.8 | 60.7 |
| R-value* | 7.1 | — | — | 12.9 | 11.3 |
| Modulus of elasticity* (N/m$^2$) | 7,260 | — | — | 28,700 | 23,250 |

*see Table A

We claim:
1. A polymer mixture comprising the following constituents:
    (A) a polyphenylene ether;
    (B) a polyvinyl aromatic compound, and
    (C) a polyfunctional dienophilic compound is 0.01–4% by weight calculated with respect to the sum of the parts by weight of the A plus the B and said mixture is thermoplastically deformable.
2. A polymer mixture as claimed in claim 1, characterized in that the polymer mixture has been prepared by mixing the constituents A, B, and C in the melt.
3. A polymer mixture as claimed in claim 1, characterized in that the polymer mixture comprises 5–95% by weight of A, 5–95% by weight of B, and 0.01–4% by weight of C calculated with respect to the sum of the parts by weight of A and B.
4. A polymer mixture as claimed claim 1, characterized in that the polymer mixture comprises a high-impact polystyrene as constituent B.
5. A polymer mixture as claimed in claim 1, characterized in that the polymer mixture comprises as constituent C more than 0.01% by weight, but less than 1% by weight, of the polyfunctional dienophilic compound.
6. A polymer mixture as claimed in claim 5, characterized in that the polymer mixture comprises a bismaleimide as constituent C.
7. A polymer mixture as claimed in claim 1, characterized in that the polymer mixture comprises one or more of the following constituents: an agent to improve the tensile strength, a filler, glass fibres, carbon fibres, antistatics, stabilizers, plasticizer, flame retarding agents, dyes.
8. A polymer mixture as in claim 1, further comprising a polyolefin.